United States Patent [19]

Sterner et al.

[11] 4,099,689
[45] Jul. 11, 1978

[54] METHOD OF SPREADING FERTILIZER, PLANT KILLER OR SIMILAR AGENTS FROM AN AIRCRAFT

[75] Inventors: Thore Sterner; Arne Johansson, both of Borlange, Sweden

[73] Assignee: Sterner Aero Aktiebolag, Borlange, Sweden

[21] Appl. No.: 823,437

[22] Filed: Aug. 10, 1977

Related U.S. Application Data

[62] Division of Ser. No. 695,321, Jun. 14, 1976.

[51] Int. Cl.² ............................................. B64D 1/18
[52] U.S. Cl. .................................... 244/136; 214/152
[58] Field of Search ..................... 214/152, 41, 44 R; 244/136, 137 R; 258/1.8; 239/171

[56] References Cited

U.S. PATENT DOCUMENTS

| 3,227,401 | 1/1966 | Currier | 258/1.2 X |
| 3,688,952 | 9/1972 | Barlow | 244/136 X |

Primary Examiner—Albert J. Makay
Attorney, Agent, or Firm—Dressler, Goldsmith, Clement, Gordon & Shore, Ltd.

[57] ABSTRACT

Method of spreading fertilizer, plant killer, or similar agents from an aircraft which includes the provision of a mobile station that receives a plurality of containers from which the agents are to be dispersed. The containers are filled at the station and moved on carrying means at the station to where they are to be subsequently lifted by the aircraft and the agents dispersed therefrom. The emptied container is returned to the station behind the filled container by the aircraft, disconnected therefrom, and the aircraft thereafter picks up a filled container.

3 Claims, 3 Drawing Figures

METHOD OF SPREADING FERTILIZER, PLANT KILLER OR SIMILAR AGENTS FROM AN AIRCRAFT

This application is a division of application Ser. No. 695,321, filed June 14, 1976, entitled "Apparatus for Spreading Fertilizer, Plant Killer or Similar Agents from an Aircraft."

The present invention relates to a method of spreading fertilizer, plant killer, or similar agents from an aircraft. The method employs a container intended to be removably connected to the aircraft and having means for discharging the said agent, which it contains, through at least one opening made in the container.

Apparatus to be used with the novel method disclosed herein are already known. Such a known apparatus comprises a container intended for removably connecting to a helicopter, for example, and which is connected to a motor-driven discharging device, which on rotation throws material, e.g., granulated fertilizer, out through a circular discharge opening in the bottom of the container. The container consists in general of a hollow vertical cylinder to the lower opening of which is attached the larger opening of a hollow truncated cone. The smaller opening of the cone thus forms the discharge opening. The fertilizing agent is intended to be introduced through the upper opening of the cylinder.

To the container there are attached a leg structure supporting the container in its vertical position on the ground, and a stirrup-like suspending means which is intended for removably coupling to a helicopter, for example. This stirrup can be rigidly connected to the container, or the container can also be pivotable at two points on the stirrup, in a vertical plane parallel to the flight direction of the helicopter.

A container of this kind described above is burdened with many drawbacks. In the first place, it does not have a shape which cooperates to reduce air resistance, and does not include any means keeping it in a predetermined position in relation to the helicopter mainly independent of wind conditions, the speed of the helicopter and the amount of fertilizer in the container. During fertilizing from the air, the container will twist around its vertical central axis when the discharge device rotates, or the suspension means will be exposed to twisting stresses if this means resists such rotation. Further, the container will swing backwards and forwards in a vertical plane parallel to the direction of flight, the extent of this swinging motion depending on the flight speed amount of fertilizer in the container. This oscillation notably increases air resistance, especially when the filling opening of the container is turned into the direction of flight, i.e., fowards, and causes unstable flying conditions, increased stress on the suspension means, an impaired fertilizing pattern, etc. A still further reason for the good fertilizing pattern, i.e., the even spread of fertilizer, becoming worse is that the fertilizer granules are broken up against the leg structure surrounding the container and are therefore prevented from being thrown out to the required degree. Furthermore, the leg structure notably increases air resistance and is an obstruction when transporting the container to different fertilizing depots with ground vehicles.

The novel method of the present invention provides for an efficient and economical way for spreading fertilizer, plant killer, or similar agents by use of an aircraft in conjunction with a mobile station wherein containers containing the aforementioned agents are filled and positioned for ready access by the aircraft. Essentially, the apparatus used with this novel method includes a container of the type described above, which is designed to be located at a mobile station, and to be picked up and handled by a hovering aircraft. The container in which the agents are located to be dispersed are filled at the mobile station and moved to a forward position where they are to be connected to an aircraft for removal to an area to be fertilized. After the material has been dispersed from the container, the aircraft and emptied container are returned to the mobile station where the container is again filled and moved into position to be lifted.

The invention will now be described while referring to the appended drawings, in which.

Figure 1:
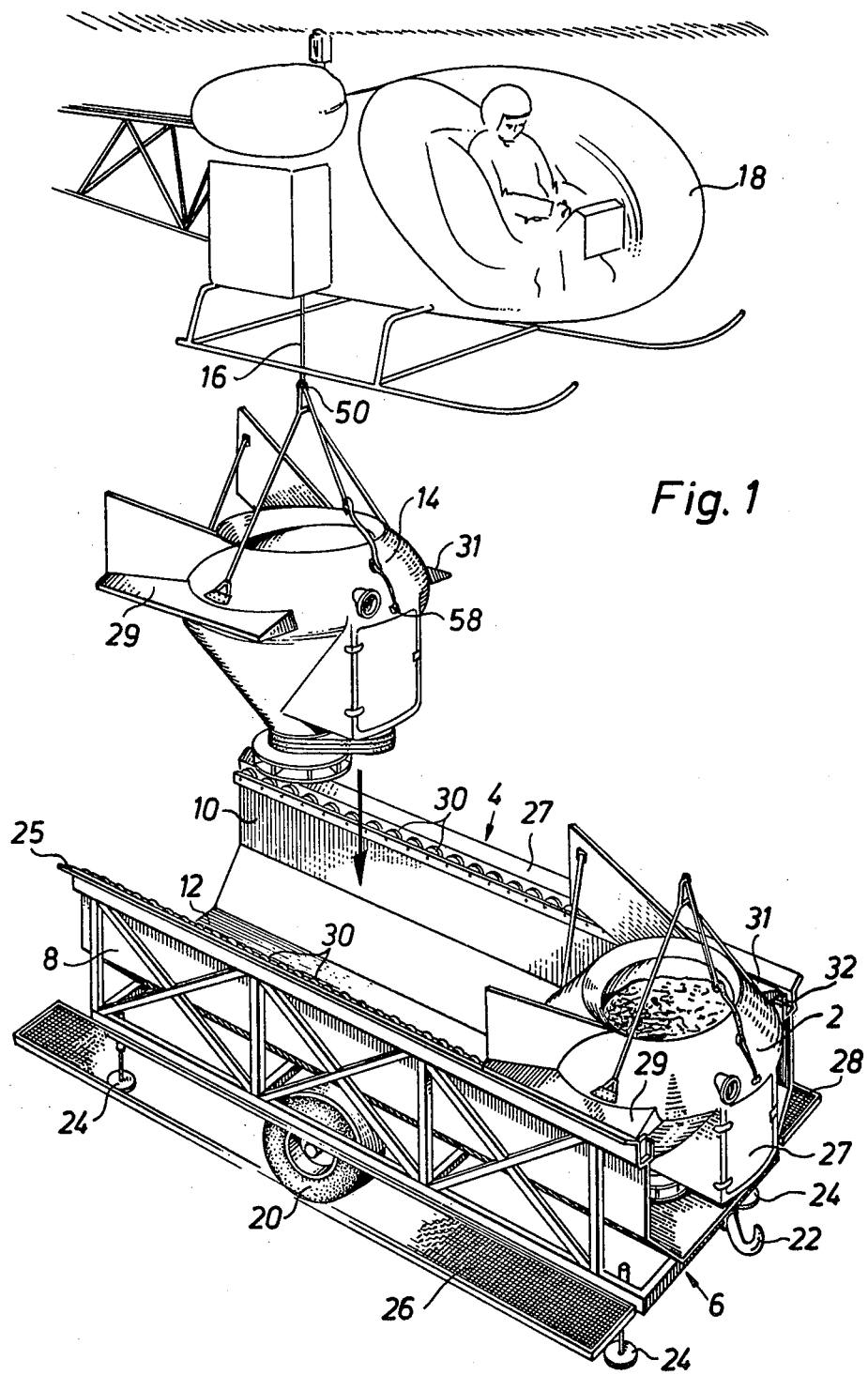
FIG. 1 is a perspective view of apparatus which can be used in accordance with the novel method forming the invention contained herein.

A container 2 filled with granular fertilizer is supported in FIG. 1 by a carriage 4, consisting of a chassis 6 including a frame and two vertical sidewalls 8 and 10, the lower portions of which converge downwardly and are attached to a bottom plate 12. The sidewalls 8 and 10 and the bottom plate 12 form together a trough-like space, open at the ends, for the container 2 and a further container 14 which is identical to the container 2 and which in FIG. 1 is shown suspended in a cable 16 depending from a helicopter 18. The carriage 4, which is provided with a pair of wheels 20 and a towing bar 22, is intended for moving by some kind of ground vehicle to, or in the vicinity of, the place where fertilizing is to take place. At said place, supporting legs 24 attached to the chassis and vertically displaceable are adjusted so that the carriage assumes a substantially horizontal attitude, whereafter platforms 26 and 28, pivotably attached to the lower portion of the chassis 6 and normally lying along the vertical outer sides of the frame, are folded out to the horizontal position shown in the figure.

With the carriage 4 in the position shown in FIG. 1, two people standing on the platforms 26 and 28 can firstly dispose the container 14 set down by the helicopter 18 so that both its wing-shaped supporting elements 29 and 31 are arranged to abut against supporting means attached to the upper edges of the sidewalls 8, 10, said means being in the shape of rollers 30 situated within obliquely upwardly directed guide flanges 25 and 27 on the beams supporting the rollers, secondly, unhitch the container 14 from the cable 16, thirdly, hitch the container 2 to the cable 16 and connect a junction box attached to the container to a junction box (not shown) on a cable hanging from the helicopter after the helicopter has been moved forward a short distance, fourthly, assist lifting the container 2 from the carriage, fifthly, push the container 14 dumped on the rear portion of the carriage forward on the rollers 30 until it comes against the stops 32 which are fixed to the beams carrying the rollers at the forward ends thereof, and sixthly, fill the container 2 with the necessary amount of fertilizer.

Figure 2:
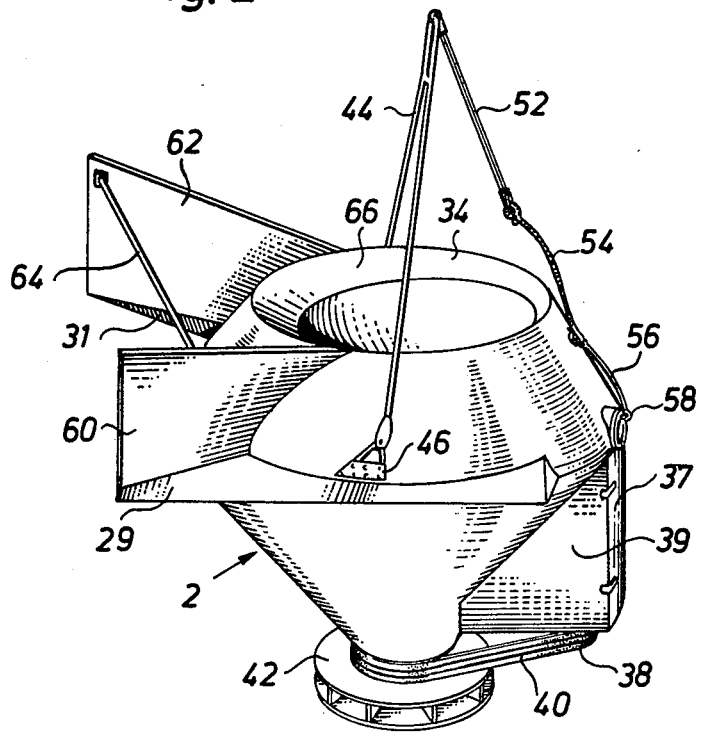
FIG. 2 is a perspective view of one of the containers shown in FIG. 1.
Figure 3:
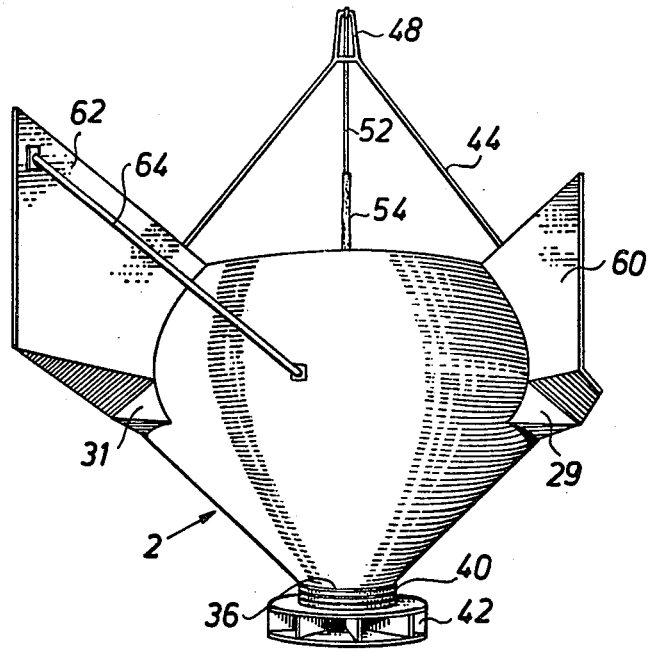
FIG. 3 is an elevation seen from behind of the container in FIG. 2.

The container 2 is shown more closely in FIGS. 2 and 3. Its upper portion is mainly in the shape of a hollow sphere with two opposing spherical segments cut off so that two openings are formed, of which one constitutes the filling opening 34 of the container 2, and the lower portion of the container has the shape of a hollow truncated cone, the greater opening of which is connected to the lower opening of the hollow sphere and the lower or smaller opening of the cone forms a discharge opening 36 for the fertilizer. This shape of the container, which is made in fiberglass, has the result that it is very stable and in principle self-supporting, and also that it has very small air resistance when it is transported by the helicopter.

A box-shaped engine room 39 is arranged on the outside of the container 2 and is accessible through a hatch 37. The engine room 39 contains a petrol motor (not shown), the driving shaft 38 of which is connected by V-belts 40 to a conventional discharging device 42 which on rotation throws the fertilizer substantially radially outwardly, and thus spreads it out over an extensive ground area under the helicopter. As may be seen from the Figures, this spread is not obstructed by any means arranged on the container 2 or on the helicopter, such as leg structures, and the like. The engine can either be started manually when the container 2 assumes the position shown in FIG. 1, or it can be started by remote control from the helicopter cabin. In the latter case, an electrical connection between the motor and the helicopter cabin is required. To regulate the amount of fertilizer discharged through the opening 39, there is arranged a conventional adjustable discharging nozzle (not shown) inside the container in conjunction with this opening, and operable electrically from the helicopter cabin.

The suspending device of the container 2 consists of a V-shaped stirrup 44, both legs of which are pivotally fastened at their ends to the trunnion fittings 46, situated somewhat behind the central axis of the container perpendicular to the flight direction. The legs are joined to each other and at their junction form an eye 48 for a hook 50 attached to the cable 16 depending from the helicopter. One end of a cable 52 is attached to the eye 48 and its other end attached to a spring 54. A second cable 56 is attached at one end to a hook or eye 58 on the forward side of the container 2 and its other end is attached to the spring 54. The collective length of wires 52, 56 and spring 54 is so selected that cables and springs are insignificantly slack when the container 2 is hanging vertically from the helicopter. The spring 54 is intended inter alia to take up the possible shocks which can arise when the container 2 swings round its horizontal axis going through the trunnions 46. The spring 54 also has another important function. When the container 2 is empty, it will substantially assume the position shown in FIG. 2, i.e., its vertical central axis will lie vertically in the flight direction and behind the eye 48 and the hook 50, the stirrup 44 forming an acute angle with the vertical, and the spring 54 preventing the container from tipping forward to avoid the opening 34 being exposed to the wind and thereby cause great air resistance. When the container 2 is filled with fertilizer the stirrup 44 will assume a substantially vertical position and the spring 54 is stretched to coact in keeping the central axis of the container substantially vertical. As the container 2 is emptied the tension in the spring 54 is successively reduced, and therefore the container will assume a stable position in which its central axis is substantially vertical virtually independent of the amount of fertilizer in the container.

At its upper rear portion, the container 2 is provided with two stabilizing fins 60 and 62 which are situated in two vertical planes at an angle of about 45° to each other. The fin 62, which is somewhat larger than the fin 60 to compensate for the torque set up by the discharging device 42 is braced in its rear upper portion by a strut 64 attached to the container wall, to prevent the fin being bent or broken by stresses caused by the wind. The fins 60 and 62 thus stabilize the container so that during flight it is kept in the attitude shown in FIG. 1 without striving to rotate about its vertical central axis which would cause twisting of the cable 16 or cause stresses in the stirrup 44 of the suspending means.

The filling opening 34 of the container 2 is surrounded by an angular collar 66 made integral with the upper edge of the container, the collar having the task of partly stabilizing the container against wind shocks caused by oscillations in it, and partly reducing the air resistance offered by the opening 34. The collar 66 is somewhat wider in its rear portion and successively merges into a narrow portion which is narrowest at the forward portion of the container 2 so that the opening 34 is still substantially circular. The collar 66 slopes downwardly towards the center of the container.

When, due, for example, to wind shocks, the container swings backwards or forwards around its horizontal central axis at right angles to the direction of flight, or around the hook 50 or the attachment of the wire 16 in the helicopter, the collar 66 together with the spring 54 acts against these oscillations so that they do not become too heavy and prevents them from being continued. The collar 66 also prevents the container 2 from assuming a somewhat forwardly inclined attitude.

The aerodynamically shaped supporting elements 29 and 31 are attached to the wall of the container and to the lower edges of the fins 60 and 62, which is best shown in FIGS. 2 and 3, thereby hindering the fins from deflecting during flight. The supporting elements 29 and 31 are each provided with a horizontal planar bottom surface, which is intended to rest and glide on the rollers 30 when the container is dumped on the carriage 4.

The novel method disclosed herein is as follows:

The mobile carriage 4 is centrally located in an area to be fertilized by the material placed in the containers 2, 14. The carriage 4 includes a plurality of rollers 30 whereby the containers can be longitudinally moved within the carriage 4 to the forward end thereof against the stops 32. The carriage 4 includes platforms 26, 28 on which two people stand when filling the containers from a source (not shown). The filled container is thus in condition to be picked up by the helicopter 18. Depending from the helicopter 18 is a cable 16 and a hook 50 which connects with the eye 48 of the V-shaped stirrup 44 to lift the container. The container is withdrawn from the carriage and moved to an area to be fertilized. When in the approproate area, the motor in the engine room 39 is operated and the rotary dispersion device 42 rotates to disperse fertilizer over the surrounding area. When the container is empty, it is returned to the carriage and placed in the rear end thereof. The empty container is disconnected and a filled container is engaged and the helicopter takes off. The empty container is filled and moved forwardly in position to be reconnected to the aircraft.

Thus, it is seen that there is provided a novel method of fertilizing an area by the use of an aircraft and a plurality of containers that are designed to operate in conjunction with the aircraft. While only two have been shown, this is by way of example only.

An embodiment of the invention has been described above. It should, however, be understood that the invention is not limited to this embodiment, but is only limited by the scope of the appended patent claims.

What is claimed is:

1. A method of raising, lowering and moving by helicopter while in flight transport containers from and to a mobile station, wherein a first container filled with transport goods, which in the station is carried in a forward position in the direction of helicopter flight, is first connected to the helicopter and lifted by it from the station, whereafter a second container carried in a rear position in the direction of helicopter flight is moved in the station on carrying means attached to the station to the said forward position, whereafter the first container previously emptied of transport goods is set down by the helicopter in the station in the said rear position or in a position behind this, whereafter the helicopter is disconnected from the first container and connected to the filled second container in the forward position.

2. A method as claimed in claim 1, wherein transport goods are filled into the second container during transport of the first container by the helicopter.

3. A method as claimed in claim 1, wherein the movement of the second container between the forward and rear position takes place manually.

* * * * *